US007730964B2

(12) United States Patent

Simm et al.

(10) Patent No.: US 7,730,964 B2

(45) Date of Patent: Jun. 8, 2010

(54) POWER TOOL AND OVERLOAD PROTECTION

(75) Inventors: Robert Simm, Oekingen (CH); Cornelis Van Der Schans, Dietlikon (CH); Markus Weber, Baetterkinden (CH)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 11/915,230

(22) PCT Filed: Jul. 3, 2006

(86) PCT No.: PCT/EP2006/063799

§ 371 (c)(1),
(2), (4) Date: Nov. 21, 2007

(87) PCT Pub. No.: WO2007/017315

PCT Pub. Date: Feb. 15, 2007

(65) Prior Publication Data

US 2008/0185984 A1 Aug. 7, 2008

(30) Foreign Application Priority Data

Aug. 8, 2005 (DE) ....................... 10 2005 037 254

(51) Int. Cl.
*B23Q 5/00* (2006.01)

(52) U.S. Cl. ....................... 173/181; 173/182; 173/179; 173/216; 173/217

(58) Field of Classification Search .................. 361/23; 318/434, 721; 173/181, 182, 179, 219, 217
See application file for complete search history.

(56) References Cited

U.S. PATENT DOCUMENTS

| | | | | |
|---|---|---|---|---|
| 4,317,176 A * | 2/1982 | Saar et al. | 700/168 |
| 5,573,074 A * | 11/1996 | Thames et al. | 173/178 |
| 6,796,921 B1 * | 9/2004 | Buck et al. | 475/299 |
| 2003/0221928 A1 | 12/2003 | Koslowski | |
| 2004/0026728 A1 | 2/2004 | Yoshida et al. | |
| 2004/0224621 A1 | 11/2004 | Fraser et al. | |
| 2006/0124331 A1 | 6/2006 | Stirm et al. | |

FOREIGN PATENT DOCUMENTS

| | | |
|---|---|---|
| DE | 196 29 623 | 1/1998 |
| DE | 20 2004 004 749 | 10/2005 |
| GB | 2 315 438 | 2/1998 |

* cited by examiner

*Primary Examiner*—Bentsu Ro
*Assistant Examiner*—Erick Glass
(74) *Attorney, Agent, or Firm*—Michael J. Striker

(57) ABSTRACT

The invention relates to a power tool having a change-speed gear device comprising a plurality of gears (1, 2) for adjusting on demand power stages of a drive, wherein an overload protection can be coupled to the gears (1, 2). According to the invention, the device comprises at least one gear (3) in which the overload protection function can be forcibly deactivated. The invention also relates to an overload protection.

6 Claims, 1 Drawing Sheet

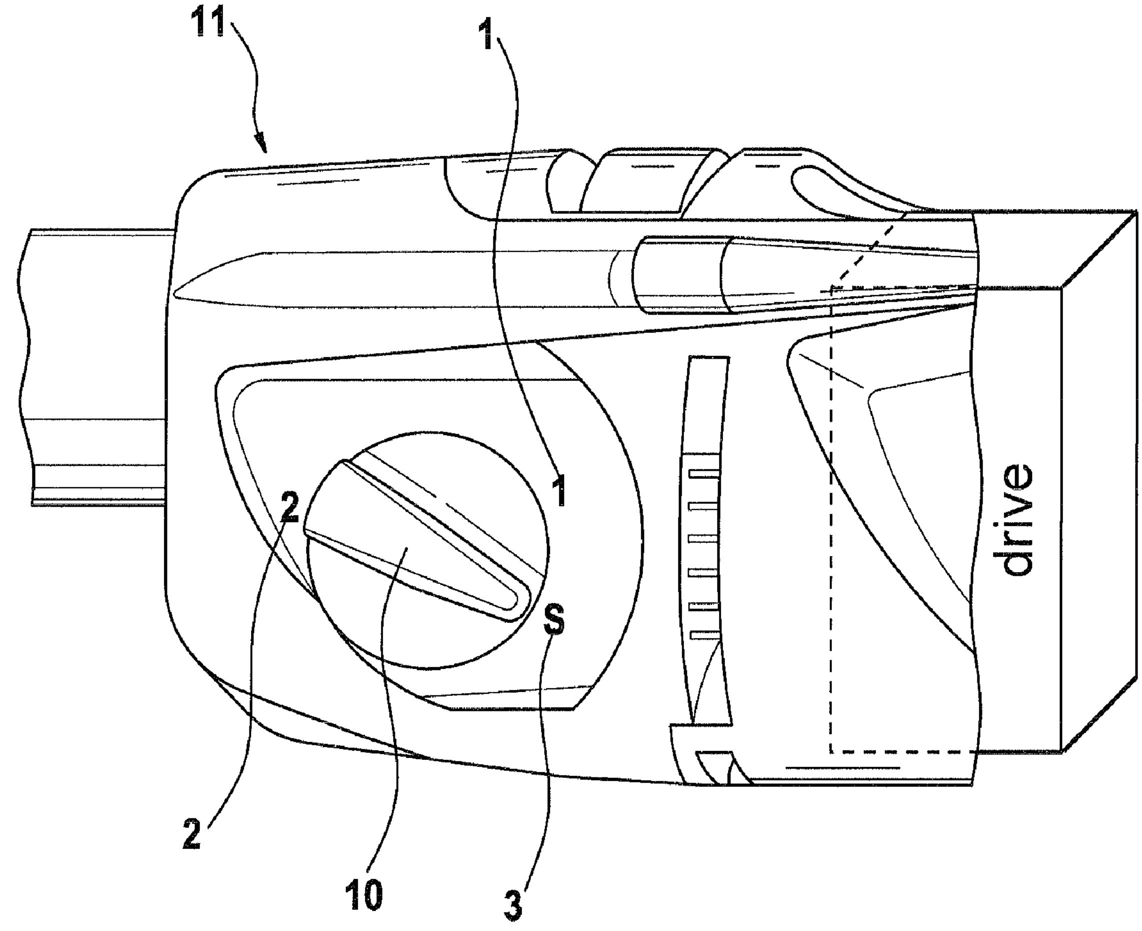
11
1
1
2
S
drive
2
10
3

POWER TOOL AND OVERLOAD PROTECTION

CROSS-REFERENCE TO RELATED APPLICATION

The invention described and claimed hereinbelow is also described in German Patent Application DE 10 2005 037 254.6 filed on Aug. 8, 2005. This German Patent Application provides the basis for a claim of priority of invention under 35 U.S.C. 119(a)-(d).

BACKGROUND OF THE INVENTION

The present invention relates to a power tool with an overload protection device.

Power tools according to the related art are usually equipped with a protection mechanism that is integrated in the electronics. As soon as a certain power stage is exceeded when working with the power tool, the machine is automatically shut off via its overload protection function ("torque function"). A desired torque is set as the default by electronic elements. Mechanically-acting release couplings are used, e.g., to limit torque. Electronic torque limitation enables the device to be shut off immediately and with virtually no backlash. This function is active, in principle, in many power tools. This has the disadvantage, however, that maximum power is not available with power tools of this type, because the device is shut off automatically before maximum power is reached. With other power tools, the overload protection function may be switched on and off manually, e.g., using a switch or an actuator wheel, with this function being active in all gears. This has the disadvantage, however, that the operator may overheat the motor when the device is operated in second gear (with the overload protection function activated), without his having first switched to first gear (in which overheating possibly may not occur). The speed is reduced via the electronics, which automatically reduce the speed when torque is high in maximum-load operation. Since the device is not shut off automatically, the operator is not forced to switch to first gear.

SUMMARY OF THE INVENTION

With an inventive power tool that includes a gear-shifting mechanism with a plurality of gears for selecting the power stages of a drive as needed, it is possible to couple an overload protection function with the gears. At least one gear is provided in which the overload protection function may be forcibly deactivated. With an inventive overload protection device, at least one gear is provided with a shut-off function that is forcibly deactivated when overload occurs. By coupling the gear-shift lever with electronics, maximum power is advantageously provided without the power tool being shut off prematurely by the overload protection function and without the power tool becoming overheated.

Favorably, the operator may select the power he requires for the particular application. A gear-shifting lever—preferably a rotary knob—is advantageously provided. The operator may select, e.g., a first gear with a higher reduction, as usual, when it is likely that strong loads will be placed on the power tool, e.g., due to high contact forces and torques. If less of a load will be placed on the power tool, the operator may select a second gear with a lower reduction. The electronics are designed such that the power tool shuts off automatically at a certain power level to prevent damage, to the electric motor and the transmission in particular. If greater power is still required, a third level may be selected. In this position—according to the present invention—the first gear with the lowest power stage is the mechanical default, with the overload protection function being shut off via the electronics. Advantageously, maximum possible output of the power tool is therefore available. With this coupling, it is possible to prevent the operator from operating in second gear, which would cause the motor to heat up too quickly.

Further embodiments, aspects and advantages of the present invention also result independently of their wording in the claims, without limitation to generality, from exemplary embodiments of the present invention presented below with reference to the drawing.

BRIEF DESCRIPTION OF THE DRAWINGS

FIG. 1 of the drawing shows a power tool in accordance with the present invention.

DESCRIPTION OF THE PREFERRED EMBODIMENTS

The sole FIGURE shows a detailed view of an embodiment of an inventive power tool 11, in which a rotary knob 10 is shown. Using rotary knob 10, a gear-shifting mechanism that includes a plurality of gears 1, 2 may be actuated for selecting power stages of a drive as required. Rotary knob 10 may be used to shift a mechanical transmission as usual. Using gear 1 and gear 2, it is possible to select between a higher reduction and a lower reduction. The electronics in gears 1 and 2 are designed such that power tool 11 shuts off automatically when a certain level of output is reached. The overload protection function is therefore active in gears 1 and 2.

If even greater power is desired, a gear 3 may be selected using rotary knob 10. Gear 1, with the lowest power stage, is the mechanical default, but the overload protection function may be forcibly deactivated. The maximum power that power tool 11 is capable of outputting may therefore be attained. At the same time, it is possible to prevent the operator from operating in second gear, which would cause the motor to heat up too quickly.

What is claimed is:

1. A power tool, comprising a drive; and a gear-shifting mechanism including a plurality of gears for selected power stages of said drive as required, it being possible to couple an overload protection function with said gears; and an additional gear in which the overload protection function is forcible deactivatable.

2. A power tool as defined in claim 1, wherein said additional gear has a default speed stage which is a lowest speed stage.

3. A power tool as defined in claim 1, further comprising a rotary knob for selecting the gears.

4. An overload protection device for a power tool, couplable with a gear-shifting mechanism that includes a plurality of gears for selecting power stages of a drive, wherein the device includes at least one additional gear provided with a shut-off function that is forcibly deactivated when overload occurs.

5. An overload protection device as defined in claim 4, wherein said additional gear has a default speed stage which is a lowest speed stage.

6. An overload protection device as defined in claim 4, further comprising electronics via which an output of the power tool is adjustable.

* * * * *